United States Patent Office 3,046,112

Patented July 24, 1962

3,046,112

QUINONE DIAZIDE PRINTING PLATES

Maximilian Paul Schmidt and Oskar Süs, Wiesbaden-Biebrich, Germany, assignors, by mesne assignments, to Azoplate Corporation, Murray Hill, N.J.

No Drawing. Filed July 18, 1957, Ser. No. 672,564
Claims priority, application Germany June 30, 1951
30 Claims. (Cl. 96—33)

The present invention relates to light-sensitive material suitable for use in making images photomechanically, which are suitable for use in planographic and offset printing.

It has been found that images which are useful in planographic and offset printing plates can advantageously be obtained by producing on a suitable base material a light-sensitive layer comprising essentially a water-insoluble aromatic sulfone of the benzo- and naphthoquinone-(1,2)-diazides. The light sensitive layer is exposed to light under a master and subsequently treated with alkali.

According to this process a positive image is obtained from a position master and a negative image from a negative master.

In order to produce a printing plate the image obtained has only to be inked with greasy ink. It then is available for the production of copies in a printing machine, for example, a machine for planographic printing or planographic offset printing.

The ortho-quinone diazides which may be used according to the present invention are all compounds of this chemical constitution which are water-insoluble and which bleach considerably upon exposure to light.

The water-solubility of the aromatic sulfones of benzo- and naphthoquinone-(1,2)-diazides can easily be tested by shaking the compounds (which are more or less colored) with water in a test tube at room temperature and filtering them. If the filtrate is colored the use of the tested o-quinone diazide for the purpose of the present invention should be avoided as compounds of this type do not prove practically suitable for positive printing. The capability of bleaching out the ortho-quinone diazide can also be tested in a simple manner by exposing them to the action of light.

Generally o-quinone diazides of higher molecular weight are to be preferred in view of their low tendency to crystallize and because they yield clear, varnish-like layers which show good adhesion to the support or base material. The images produced with the aid of higher molecular o-quinone diazides are more greasy ink receptive so that they are more suitable for printing plates.

The ortho-quinone diazide sulfones which prove suitable for the purpose of the present invention are defined by the following formulae:

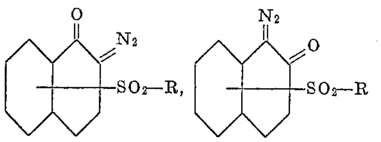

and

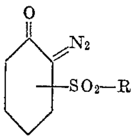

in which R is an aryl or substituted aryl radical.

The tendency to crystallize can to a large extent be prevented by adding alkali-soluble resins to the aromatic sulfones of the ortho-quinone diazides in question and/or by mixing several o-quinone-diazides with each other.

If strongly colored images are required right after the development, suitable dyestuffs are incorporated in the light-sensitive layers or the developed diazo images are heated to elevated temperatures whereby dyestuff images are obtained which are fast to light and accept greasy ink. The addition of sensitizers or azo components can also be of advantage.

In order to get a good differentiation between the unexposed and the exposed parts of the layer in the course of the development of the image with an alkaline solution it is useful to exclude o-quinone diazides containing solubilizing groups.

For the production of the light-sensitive layers the ortho-quinone diazides to be used according to the present invention are dissolved, if necessary, with the addition of resins and/or minor quantities of fatty acids, dyestuffs, sensitizers, thiourea or azo components in suitable organic solvents, such as in dioxane and glycol monomethyl ether. This solution is coated as a thin uniform layer onto a suitable base material, preferably onto metal plates or metal foils, e.g. aluminum foils. The light-sensitive material thus produced has excellent stability and can be stored for a long time.

The image is developed by treating the exposed material with a dilute alkaline solution, e.g. of trisodium phosphate, soda, etc., to which, if necessary, wetting agents, colloids or solvents such as alcohol may be added in low proportions.

The following formulae which are referred to in the subsequent examples are inserted in order to illustrate the present invention:

(1)

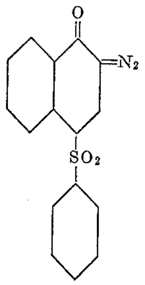

(2)

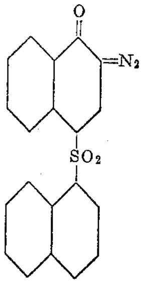

(3)

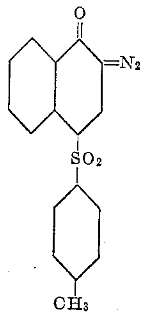

(4)

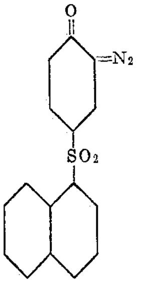

(5)

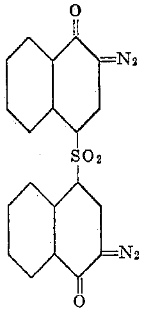

(6)

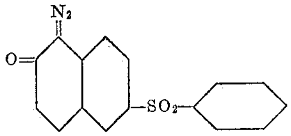

(7)

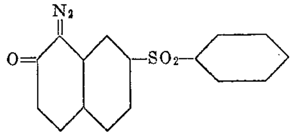

(8)

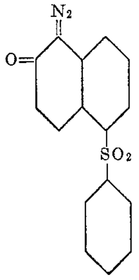

(9)

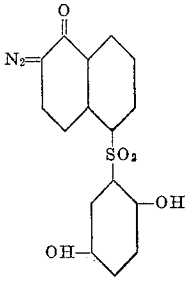

*Examples*

(1) One side of a mechanically roughened aluminum foil is coated on a plate-whirler with a glycolmonomethylether solution which contains in each 100 cc. of the solvent one part by weight of the diazo compound corresponding with Formula 1 and 0.2 part by weight of a phenol-formaldehyde-novolak (an alkali soluble phenol-formaldehyde resin which is sold by the firm "Chemische Werke Albert" at Wiesbaden-Biebrich, Germany) under the name "Alnovol" (registered trademark in Germany). The layer thus produced is dried first with hot air and subsequently in a drying chamber for five minutes at a temperature of 90° C.; the dried layer is then exposed to light (arc lamp of 18 amperes at a distance of 70 cm.) for two minutes under a transparent positive pattern, and the image thus produced is developed by wiping with a cotton swab saturated with a solution containing five to ten percent of trisodium phosphate. The foil bearing the positive image thus obtained can be wiped over with an aqueous solution containing eight percent of dextrin, one percent of phosphoric acid, and one percent of formaldehyde, and can be used as a printing plate after the image has been inked with greasy ink.

In place of the above-mentioned diazo compound (Formula 1), the diazo compound corresponding with Formula 2 can be used and yields the same result.

The diazo compound corresponding with Formula 1, naphtho-quinone-(1,2)-diazide-(2) - phenyl-sulfone-(4), is prepared in the following manner:

Thiophenol is caused to react in an aqueous-alcoholic solution of caustic soda with 1-nitro-4-chloronaphthalene to form 1-nitro-naphthyl-phenyl-sulfide-(4) (compare H. Hodgson and E. Leigh, Journal of the Chemical Society of London, 1939, page 1095), and the latter is oxidized by heating for two hours in a tenfold quantity of glacial acetic acid with 1.3 parts by volume of a thirty percent solution of hydrogen peroxide to form the respective sulfone. The nitro compound is catalytically reduced in an autoclave using a nickel catalyst. The 1-amino-naphthalene-phenyl-sulfone-(4) thus obtained is diazotized with 2.2 parts by volume of a forty-percent solution of sodium nitrite in a mixture of 12 parts by volume of glacial acetic acid and 12 parts by volume of forty-percent sulfuric acid. Without being isolated the diazo compound is converted into 2-nitro-1-hydroxy-naphthalene-phenyl-sulfone-(4) by boiling the diazotization mixture. The precipitation of the reaction product, only a part of which is separated during the boiling operation, is completed by addition of water. After crystallization from glacial acetic acid, the product melts at 202°–203° C.

One part by weight of 2-nitro-1-hydroxy-naphthalene-phenyl-sulfone-(4) is dissolved in ten parts by volume of dioxane and catalytically reduced with 0.5 part by weight of Raney nickel at room temperature. After filtering by suction the solution is mixed with five parts by volume of a concentrated hydrochloric acid, and the hydrochloride of the amino-sulfone is diazotized with 0.7 part by volume of a forty percent solution of sodium nitrite. When the solution is diluted with water, the naphthoquinone-(1,2)-diazide-(2)-phenyl-sulfone-(4) precipitates in the form of yellow crystals which melt after recrystallization from glacial acetic acid at 169°–170° C. under decomposition.

The preparation of the napthoquinone-(1,2)-diazide-(2)-naphthyl-sulfone-(4) (Formula 2) is effected analogously. The 4-hydroxy-3-nitro-1, 1'-dinaphthyl-sulfone obtained as an intermediate product, after being recrystallized from glacial acetic acid, forms reddish-yellow crystals and melts at 204°–205° C. The diazo compound forms pale yellow crystals and melts at 128°–130° C. under decomposition.

(2) A paper foil is on the market in the United States which is produced in accordance with Patent No. 2,534,588 and is provided on one side with a layer containing casein and clay, which layer is hardened by formaldehyde. This layer is coated with a glycol-monomethyl ether solution, containing in each hundred parts by volume of the solvent two parts by weight of the diazo compound corresponding with formula 3 and 0.4 part by weight of the phenol-formaldehyde-novolak mentioned in Example 1, and is thoroughly dried in a current of hot air. The image produced by the exposure of the foil behind a positive pattern is developed with a one-percent solution of trisodium phosphate and is then briefly treated with a solution containing primary ammonium phosphate, glycerine, and phosphoric acid. The positive image thus obtained can be inked with greasy ink.

Naphthoquinone - (1,2) diazide-(2)-4′-methyl-phenyl-sulfone-(4) (Formula 3) is prepared by a method which is analogous to the method indicated for the production of naphthoquinone-(1,2)-diazide-(2)-phenyl-sulfone-(4) in Example 1. 1-hydroxy-2-nitro-naphthalene-4′-methyl-phenyl-sulfone-(4) is obtained by boiling the diazo compound prepared from 1-amino-naphthalene-4′-methyl-phenyl-sulfone-(4) and melts at 240° C. The naphthoquinone-diazide (Formula 3) produced via the aforesaid intermediate products melts at 166° C. under decomposition.

(3) In accordance with the method indicated in Example 1, an aluminum foil is coated with a solution of one part by weight of the diazo compound corresponding with Formula 4 and 0.2 part by weight of the phenol-formaldehyde-novolak described in Example 1 in one hundred parts by volume of dioxane, and is exposed to light under a positive pattern subsequent to the dyeing of the layer. The exposed foil is developed by wiping with a three percent solution of trisodium phosphate, and afterwards the image side is briefly wiped over with a one percent solution of phosphoric acid. The positive image thus obtained is inked with greasy ink and can be used as a printing plate.

The diazo compound corresponding with Formula 4, benzoquinone-(1,2)-diazide-(2)-naphthyl-sulfone - (4), is produced in the following manner:

Fifty parts by weight of 1-thionaphthol are dissolved in one hundred parts by volume of hot alcohol, and this solution is mixed with a boiling solution of 49 parts by weight of 1,4-chloro-nitro benzene in 150 parts by volume of alcohol. Subsequent to the addition of fifty parts by weight of a twenty percent solution of caustic soda, the mixture is heated for one hour to the boiling point. The reaction product separates in the form of an oil and after decantation of the solvent it is treated with dilute hydrochloric acid and water until it crystallizes. The 1-nitro-phenyl-naphthyl-sulfide-(4) is recrystallized from 95 percent acetic acid and melts at 84°–86° C.

Five parts by weight of this compound are dissolved in sixty parts by volume of glacial acetic acid and are oxidized by heating for two hours on a steam bath with seven parts by volume of a thirty percent solution of hydrogen peroxide, 1-nitro-phenyl-naphthyl-sulfone-(4) (melting point: 150° C.) being formed. The latter is dissolved in dioxane and catalytically reduced using a nickel contact. From the filtered reduction solution there precipitates on addition of water the amino-sulfone in the form of a white crystalline powder which melts at 203° C. 8.4 parts by weight of this compound are diazotized in 72 parts by volume of forty percent sulfuric acid with eight parts by volume of a forty percent solution of sodium nitrite. Stirring of the diazotization mixture is continued while cooling with ice and the diazonium sulfate crystallizes. It is then filtered, added to 200 parts by volume of boiling sulfuric acid (40%), and 1-hydroxy - phenyl - naphthyl-sulfone-(4) is precipitated, which is dissolved in an eightfold quantity of glacial acetic acid and heated (after 1.1 mols of 99 percent nitric acid has been added) for fifteen minutes on a steam bath. 1-hydroxy-2-nitro-phenyl-naphthyl-sulfone-(4) is thus obtained. Five parts by weight of this compound are dissolved in fifty parts by volume of dioxane and are catalytically reduced with three parts by weight of Raney-nickel. After the nickel is filtered off by suction, the reduction solution is mixed with ten parts by volume of concentrated hydrochloric acid and is diazotized with 3.5 parts by volume of a forty percent solution of sodium nitrite. On dilution with water, the benzoquinone-(1,2)-diazide-(2)-1-naphthyl-sulfone-(4) precipitates in the form of a yellow crystalline sediment. The benzoquinone diazide becomes red colored when heated above 100° C. and slowly starts to get black at a temperature of 125° C.

(4) An aluminum foil is coated with a one-percent solution of the diazo compound corresponding with Formula 5 in glycol-monomethyl ether, and the coated side is dried thoroughly. The sensitized foil is exposed to light under a transparent positive pattern in the customary manner, e.g. to the light of an arc lamp, and the image thus produced is developed with a five percent solution of disodium phosphate. The greenish-yellow colored positive image is briefly wiped over with a one percent solution of phosphoric acid and can then be used for printing after being inked with greasy ink.

Dinaphthyl-sulfone - (1,1′) - diquinone-(3,4,3′,4′)-bis-diazide-(3,3′) (Formula 5) is prepared by suspending 24 parts by weight of 1-nitro-naphthalene-(1′-nitro)-naphthyl-sulfide-(4) (compare H. Hodgson and E. Leigh, Journal of the Chemical Society 1937, page 1352) in 450 parts by volume of glacial acetic acid and this mixture is heated, while stirring together with 15 parts by volume of a thirty percent solution of hydrogen peroxide on a steam bath to a temperature of 90°–100° C. After half an hour another fifteen parts by volume of hydrogen peroxide are added and the mixture is stirred for another hour at the temperature indicated above. Subsequent to cooling, the yellow-crystallized 1-nitro-naphthalene-(1′-nitro)-naphthyl-sulfone-(4) is filtered off. It melts at 254°–255° C. The dinitro compound is catalytically reduced in an autoclave by using a Raney nickel catalyst at room temperature. Eight parts by weight of 1-amino-naphthalene-(1′-amino)-naphthylsulfone-(4) are diazotized with fifteen parts by volume of a forty percent solution of sodium nitrite in a mixture of 120 parts by volume of glacial acetic acid and 120 parts by volume of forty percent sulfuric acid and the diazo compound is converted into 1-hydroxy - 2 - nitro-naphthalene-(1′-hydroxy-2′-nitro)-naphthylsulfone-(4) by boiling the diazotization mixture. The crude product obtained is purified by extracting with an approximately fivefold quantity of boiling glycol-monomethylether and subsequently treating with ether for the purpose of removing impurities. The melting point after purification is 264°–266° C.

Two parts by weight of yellow-colored dihydroxy-dinitro-sulfone are dissolved in forty parts by volume of dioxane and catalytically reduced with the addition of two parts by weight of Raney nickel. To the filtered reduction solution, ten parts by volume of concentrated hydrochloric acid are added and then three parts by volume of a forty percent solution of sodium nitrite are added drop by drop while the solution is stirred at room temperature. When the diazotization mixture is diluted with water, the dinaphthyl-sulfone-(1,1′)-diquinone-(3,4,3′,4′)-bisdiazide-(3,3′) precipitates in the form of a yellow crystalline sediment. In order to determine the point of decomposition, the capillary tube is put in concentrated sulfuric acid at 100° C. and rapidly heated.

(5) One part by weight of the diazo compound corresponding to Formula 6 is dissolved in 100 parts by volume of a mixture consisting of equal parts of dimethyl-formamide and monomethyl glycol ether, and a mechanically roughened aluminum foil is coated with this solution and dried. If the foil, thus sensitized, is exposed under a transparent positive original and then wiped over with a 10% trisodium phosphate solution, a slightly green-colored positive image is obtained. By a subsequent short treatment of the image side of the foil with 1% phosphoric acid, a positive printing plate is produced. This printing plate may be linked with greasy ink (the ink adhering to the image) and is then ready for printing.

Instead of the compound corresponding to Formula 6 the compound corresponding to Formula 7 may be used for producing the light-sensitive layer. In this case, development is effected by means of a 15% trisodium phosphate solution.

The diazo compound corresponding to Formula 6, the naphthoquinone-(1,2)-diazide-(1)-phenyl-sulfone-(6), is prepared as follows:

β-naphthol-6-sulfonic acid is esterified with p-toluene sulfochloride to form 2-0-(toluene-sulfonyl)-naphthalene- 6-sulfonic acid, which is then transformed into its sulfochloride (melting point 142° C.) by reaction with phosphorous pentachloride. Said sulfochloride is then caused to react with benzene according to the method described by Friedel Crafts, the toluene-sulfonic-acid-ester of 2-hydroxy-naphthalene-6-phenyl-sulfone with the melting point 149° being formed. This ester is saponified with a dilute caustic soda solution to yield the 2-hydroxy-naphthalene-6-phenyl-sulfone (melting point 179–180°). This hydroxy compound is coupled with diazotized aniline to form the 2-hydroxy-1-(phenyl-azo)-naphthalene-6-phenyl-sulfone (melting point 198°), which is then reduced to the 1-amino-2-hydroxy-naphthalene-6-phenyl-sulfone, which melts at 210–212° under decomposition. This hydroxy-amino compound is first mixed with dilute hydrochloric acid and then 2-n-sodium nitrite solution is slowly added while continually rubbing the solid body. Thus the naphthoquinone-(1,2)-diazide-(1)-6-phenyl-sulfone is obtained, which forms brown-yellow crystals and melts at 164° with decomposition. The diazo compound corresponding to Formula 7, i.e. the naphthoquinone-(1,2-)-diazide-(1)-phenyl-sulfone, which melts at 170°, with decomposition, is prepared analogously.

(6) A mechanically roughened aluminum foil is coated with a glycol monomethyl ether solution, which in 100 parts by volume of the solvent contains one part by weight of the diazo compound corresponding to Formula 8 and 0.4 part by weight of "Alnovol" (see Example 1). The layer is thoroughly dried, exposed under a transparent positive original, and the image thus produced is developed by means of a 3% trisodium phosphate solution to form a visible positive image. The image side of the foil is then shortly wiped over with a 1% phosphoric acid solution and inked with greasy ink.

The diazo compound corresponding to Formula 8, i.e. the naphthoquinone-(1,2)-diazide-(1)-phenyl-sulfone-(5), is prepared analogously to the method described for preparing the compounds of Formulae 6 and 7. It melts at 140–141° C., with decomposition.

(7) Analogously to the method described in Example 5, printing plates are prepared by means of the diazo compound of Formula 9. To develop the exposed layer, a 10% disodiumphosphate solution is used. A positive printing plate is obtained from a positive original.

The diazo compound corresponding to Formula 9, i.e. the naphthoquinone-(1,2)-diazide-(2)-5-(3',6'-dihydroxy-phenyl)-sulfone, is prepared by treating the oxazolone of the 1-hydroxy-2-amino-naphthalene-5-sulfonic acid with phosphorous pentachloride and transforming it thus into the corresponding sulfochloride (melting point 249°, with decomposition). This sulfochloride is then reduced with sodium sulfite to oxazolone-sulfinic acid (melting point 232°, with decomposition). On rubbing the sulfinic acid with p-benzoquinone in the presence of some water, the oxazolone of the 1-hydroxy-2-amino-5-(3',6'-dihydroxy-phenyl)-sulfone is formed (melting point 252°), which is then transformed into the corresponding hydroxyamino compound by saponification with dilute caustic soda solution. On diazotizing this hydroxy-amino compound in hydrochloric acid solution, the diazo compound precipitates as a greenish-yellow deposit, which melts at 161°, with decomposition.

This application is a division of application Serial No. 579,703, filed April 23, 1956, which is, in turn, a continuation-in-part of application Serial No. 295,822, filed June 26, 1952, and now abandoned.

What is claimed is:

1. A compound having the formula $$D—SO_2—R$$

in which D is an ortho-quinone diazide group and R is an aryl group.

2. A compound having the formula $$D—SO_2—R$$

in which D is an ortho-naphthoquinone diazide group and R is an aryl group.

3. A compound having the formula $$D—SO_2—R$$

in which D is an ortho-benzoquinone diazide group and R is an aryl group.

4. A compound having the formula

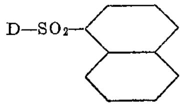

in which D is an ortho-naphthoquinone diazide group.

5. A compound having the formula

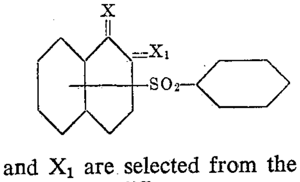

in which X and $X_1$ are selected from the group consisting of $N_2$ and O and are different.

6. A compound having the formula

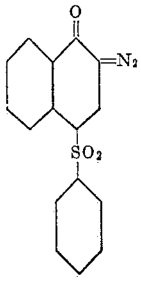

7. A compound having the formula

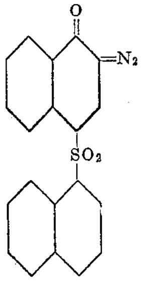

8. A compound having the formula

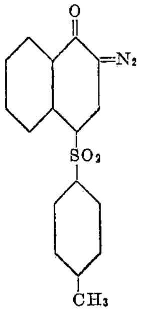

9. A compound having the formula

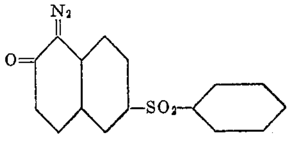

10. A compound having the formula

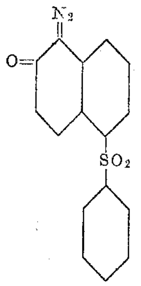

11. A presensitized printing plate comprising a base material having a coating thereon of a compound having the formula $$D—SO_2—R$$

in which D is an ortho-quinone diazide group and R is an aryl group.

12. A presensitized printing plate comprising a base material having a coating thereon of a compound having the formula $$D—SO_2—R$$

in which D is an ortho-naphthoquinone diazide group and R is an aryl group.

13. A presensitized printing plate comprising a base material having a coating thereon of a compound having the formula $$D—SO_2—R$$

in which D is an ortho-benzoquinone diazide group and R is an aryl group.

14. A presensitized printing plate comprising a base material having a coating thereon of a compound having the formula

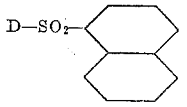

in which D is an ortho-naphthoquinone diazide group.

15. A presensitized printing plate comprising a base material having a coating thereon of a compound having the formula

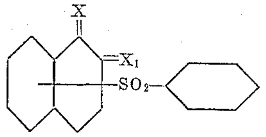

in which X and $X_1$ are selected from the group consisting of $N_2$ and O and are different.

16. A presensitized printing plate comprising a base material having a coating thereon of a compound having the formula

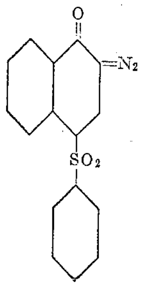

17. A presensitized printing plate comprising a base material having a coating thereon of a compound having the formula

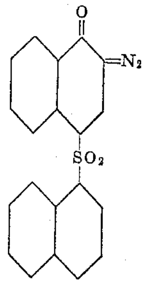

18. A presensitized printing plate comprising a base material having a coating thereon of a compound having the formula

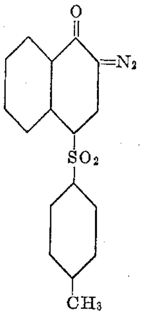

19. A presensitized printing plate comprising a base material having a coating thereon of a compound having the formula

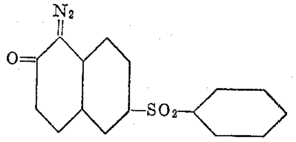

20. A presensitized printing plate comprising a base material having a coating thereon of a compound having the formula

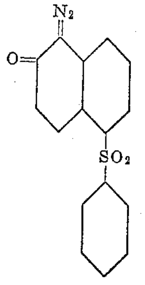

21. A process for developing a printing plate which comprises exposing to light under a master a plate having a compound thereon of the formula $$D—SO_2—R$$

in which D is an ortho-quinone diazide group and R is an aryl group; to thereby form a decomposition product in the light struck areas and removing the decomposition product by treatment with a weakly alkaline solution.

22. A process for developing a printing plate which comprises exposing to light under a master a plate having a compound thereon of the formula $$D—SO_2—R$$

in which D is an ortho-naphthoquinone diazide group and R is an aryl group; to thereby form a decomposition product in the light struck areas and removing the decomposition product by treatment with a weakly alkaline solution.

23. A process for developing a printing plate which comprises exposing to light under a master a plate having a compound thereon of the formula

D—$SO_2$—R in which D is an ortho-benzoquinone diazide group and R is an aryl group; to thereby form a decomposition product in the light struck areas and removing the decomposition product by treatment with a weakly alkaline solution.

24. A process for developing a printing plate which comprises exposing to light under a master a plate having a compound thereon of the formula

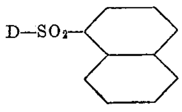

in which D is an ortho naphthoquinone diazide group; to thereby form a decomposition product in the light struck areas and removing the decomposition product by treatment with a weakly alkaline solution.

25. A process for developing a printing plate which comprises exposing to light under a master a plate having a compound thereon of the formula

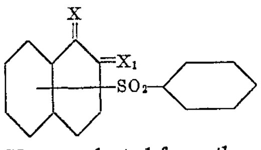

in which X and $X_1$ are selected from the group consisting of $N_2$ and O and are different; to thereby form a decomposition product in the light struck areas and removing the decomposition product by treatment with a weakly alkaline solution.

26. A process for developing a printing plate which comprises exposing to light under a master a plate having a compound thereon of the formula

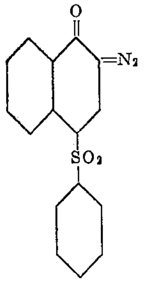

to thereby form a decomposition product in the light struck areas and removing the decomposition product by treatment with a weakly alkaline solution.

27. A process for developing a printing plate which comprises exposing to light under a master a plate having a compound thereon of the formula

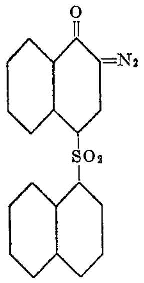

to thereby form a decomposition product in the light struck areas and removing the decomposition product by treatment with a weakly alkaline solution.

28. A process for developing a printing plate which comprises exposing to light under a master a plate having a compound thereon of the formula

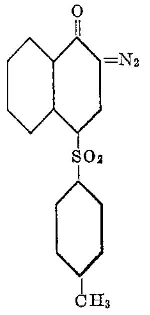

to thereby form a decomposition product in the light struck areas and removing the decomposition product by treatment with a weakly alkaline solution.

29. A process for developing a printing plate which comprises exposing to light under a master a plate having a compound thereon of the formula

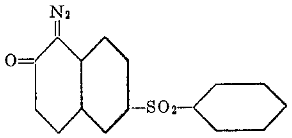

to thereby form a decomposition product in the light struck areas and removing the decomposition product by treatment with a weakly alkaline solution.

30. A process for developing a printing plate which comprises exposing to light under a master a plate having a compound thereon of the formula

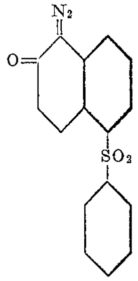

to thereby form a decomposition product in the light struck areas and removing the decomposition product by treatment with a weakly alkaline solution.

References Cited in the file of this patent

UNITED STATES PATENTS

| | | |
|---|---|---|
| 2,702,243 | Schmidt | Feb. 15, 1955 |
| 2,754,209 | Schmidt et al. | July 10, 1956 |

FOREIGN PATENTS

| | | |
|---|---|---|
| 512,485 | Belgium | July 15, 1952 |

OTHER REFERENCES

PB report, 17547–S3, July 28, 1947.

PB report, 44231, June 13, 1947.

Suter: Organic Chemistry of Sulfur, N.Y., Wiley & Sons, 3rd edition, 1948, pages 685–688.

Fiat Report No. 813, Photo-Reproduction Research of Kalle and Co., A.G. Index of Micro-Filmed Reports, June 10, 1946 (received Patent Office April 22, 1948), pages 3 and 31.